United States Patent
Pullini

(10) Patent No.: US 7,239,232 B2
(45) Date of Patent: Jul. 3, 2007

(54) TEMPERATURE SENSING DEVICE FOR ROTATABLY MOVING PARTS AND TEMPERATURE DETECTION METHOD THEREFOR

(75) Inventor: Daniele Pullini, Orbassano (IT)

(73) Assignee: CRF Societa Consortile per Azioni, Orbassano (Torino) (IT)

( * ) Notice: Subject to any disclaimer, the term of this patent is extended or adjusted under 35 U.S.C. 154(b) by 182 days.

(21) Appl. No.: 11/049,684

(22) Filed: Feb. 4, 2005

(65) Prior Publication Data

US 2005/0174224 A1 Aug. 11, 2005

(30) Foreign Application Priority Data

Feb. 6, 2004 (EP) .................................. 04425079

(51) Int. Cl.
*B60C 23/00* (2006.01)
(52) U.S. Cl. ..................... 340/442; 340/444; 340/448; 340/449
(58) Field of Classification Search ................ 340/442, 340/443, 444, 448, 449, 686.3; 73/146.2, 73/146.4; 74/335; 324/165, 174, 207.12
See application file for complete search history.

(56) References Cited

U.S. PATENT DOCUMENTS

| 4,570,152 A | 2/1986 | Melton et al. |
| 6,762,897 B1 * | 7/2004 | Kabashima et al. ........ 360/72.1 |
| 6,931,957 B2 * | 8/2005 | Saito et al. ................... 74/335 |

FOREIGN PATENT DOCUMENTS

| DE | 32 42 291 A | 5/1984 |
| FR | 2622289 A * | 4/1989 |
| WO | WO 03/100370 A | 12/2003 |

* cited by examiner

*Primary Examiner*—Van T. Trieu
(74) *Attorney, Agent, or Firm*—Sughrue Mion, PLLC

(57) ABSTRACT

A magnetic temperature sensing device for rotatably moving parts, of the type including at least a magnetic field source element associated to the rotatably moving part and a magnetic field sensing element associated with a fixed part to measure parameters of a magnetic field determined by the magnetic field source element, the parameters of the magnetic field being a function of the temperature of the rotatably moving part. The magnetic field source element permits rotation along at least an axis the direction of the magnetic field as a function of the temperature of the rotatably moving part.

12 Claims, 2 Drawing Sheets

TEMPERATURE SENSING DEVICE FOR ROTATABLY MOVING PARTS AND TEMPERATURE DETECTION METHOD THEREFOR

BACKGROUND OF THE INVENTION

The present invention relates to a magnetic temperature sensing device for rotatably moving parts, of the type comprising at least one electromagnetic field source element associated to said rotatably moving part and a magnetic field sensor element associated to a fixed part to measure parameters of a magnetic field determined by said magnetic field source element, said parameters of the magnetic field being a function of the temperature of said rotatably moving part.

Measuring the temperature of rotating parts, such as rolling elements or shafts, has always been difficult, due to the impossibility of wiring a sensor positioned on the moving part.

Of particular interest, for instance, is monitoring the temperature of motor vehicle tires, even when said motor vehicles are moving, both for general maintenance purposes, and for safety purposes when the motor vehicle travels at high speed. It is therefore important that the driver be aware at all times of the temperature of the tires, which may dramatically influence the behavior of the motor vehicle.

Several methods for monitoring tire pressure and temperature are known. Typically, a complex wiring technique is employed, or else transmitters and receivers of electromagnetic waves which require power supplies and antennas.

U.S. Pat. No. 4,570,152 discloses a temperature measuring system in tires whereby a plurality of magnetic nails are inserted in the tread of a tire at determined points. A magnetic field sensor is then mounted on a non-rotating part of the vehicle in proximity to the tire and it is used to detect the magnetic pulses generated by the plurality of rotating magnetic nails. If tire temperature grows, the heat thereby generated decreases the magnetic field generated by the magnetic nails.

Such a system, however, requires the insertion of extraneous bodies into the tread and a considerable proximity of the sensor element to the tread, to detect magnetic field intensity variations in a precise manner.

SUMMARY OF THE INVENTION

The object of the present invention is to provide a solution capable of fabricating a magnetic temperature sensing device for tires whose precision is influenced to little or no extent by the precision of the detection of the intensity of the magnetic field.

According to the present invention, said object is achieved thanks to a temperature sensing device, and a corresponding temperature measuring method having the characteristics specifically set out in the claims that follow.

BRIEF DESCRIPTION OF THE DRAWINGS

The invention shall now be described with reference to the accompanying drawings, provided purely by way of non limiting example, in which.

DETAILED DESCRIPTION OF THE INVENTION

The magnetic temperature sensor for rotatably moving parts proposed herein comprises at least one magnetic field source element associated to said rotatably moving part, in a preferred version in an inner part of a tire such as the inner tube, and a magnetic field sensing element associated to a fixed part, preferably the chassis of a motor vehicle, to measure parameters of the magnetic field of said source elements, said parameters of the magnetic field comprising in particular the direction of said magnetic field, which is made a function of the temperature of said rotatably moving part through the adoption of appropriate means of rotation as a function of temperature.

Figure 1:
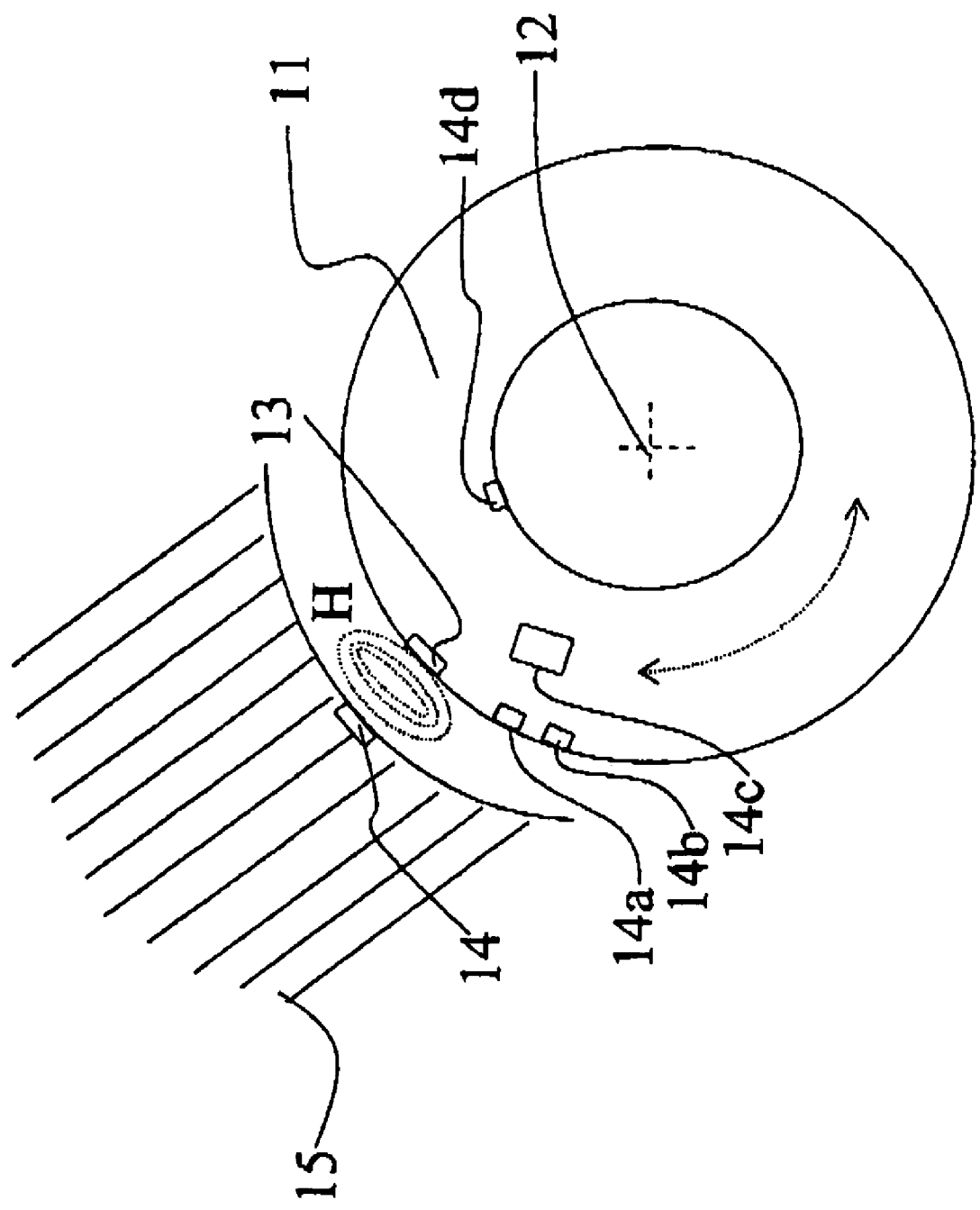
FIG. 1 shows an outline of the principle of operation of a magnetic device according to the invention.

FIG. 1 shows a diagram of the principle of operation of a device according to the invention.

A tire 11 rotating around an axis of rotation 12 comprises a magnetic field source 13, provided with its own magnetization and able to determine a magnetic field H.

Said magnetic field source 13 is preferably positioned inside the tire 11, in the inner tube. On a fixed part, in particular a fender 15 of a motor vehicle, not shown in its entirety for the sake of simplicity, is positioned a magnetic field sensor 14.

To the magnetic field H generated by the magnetic field source 13 in the region between the tire 11 and the fixed part 15 are associated a field intensity and a direction.

The magnetic field H of the magnetic field source 13 can rotate and possibly change its intensity as a function of the temperature reached by the 11. The magnetic field sensor 14 remotely measures the magnetic field H, thereby indirectly measuring temperature. The signal measured by the magnetic field sensor 14 is then sent to an electronic unit of the motor vehicle, also not shown in FIG. 1, for processing and the generation of signals and alarms.

Figures 2A, 2B:
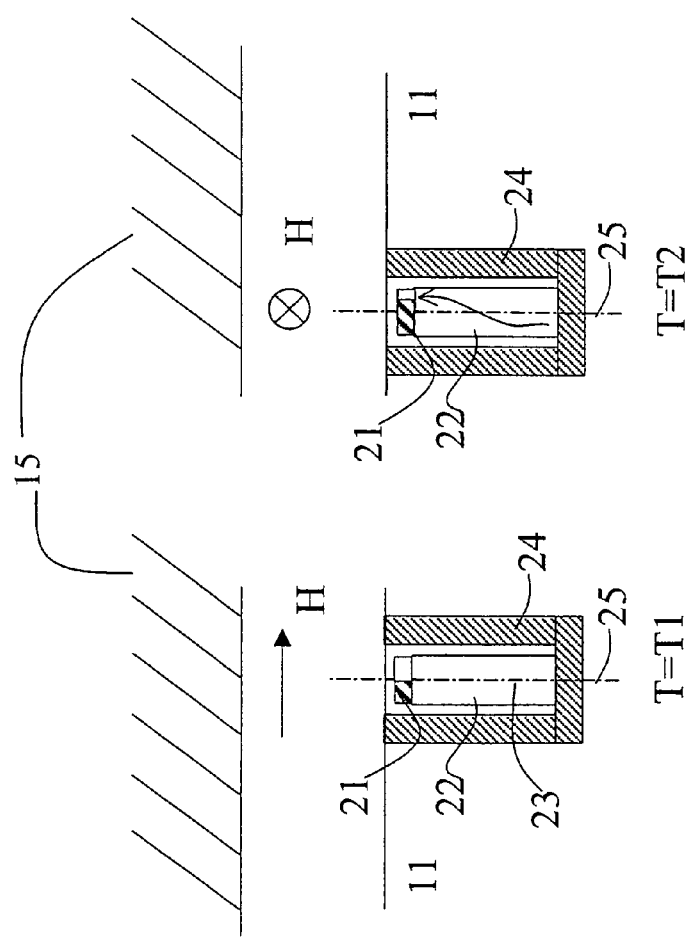
FIGS. 2A and 2B show in detail parts of the device of FIG. 1.

FIGS. 2A and 2B show in greater detail the magnetic field source 13 associated to the tire 11.

FIG. 2A shows the magnetic field source 13 in a first operating configuration relating to a value of temperature T equal to T1, whilst FIG. 2B shows the magnetic field source 13 in a second operating configuration relating to a value of temperature T equal to T2, where T2 is greater than T1.

Said magnetic field source 13 according to the invention comprises a permanent magnetic element 21, which generates a magnetic field H with constant modulus and direction. Said permanent magnetic element 21, however, is advantageously associated to a rotating element 22, which rotates according to a revolution motion along an axis 25, radial relative to the circumference defined by the tire 11. Said rotating element 22, according to a preferred embodiment, is constituted by a shape memory element, for example constructed with nickel titanium alloys or other SMAs (Shape Memory Alloys), which is capable of twisting around its own main axis in the presence of a temperature variation. As shown in FIG. 2, the rotating element 22 comprises a bar 23 of shape memory material, positioned along the axis 25 within a coaxial container cylinder 24, able to limit the vibrations produced by the motion of the tire 11.

The bar 23 is preferably fastened to the bottom of the cylinder 24 only by means of its own distal end relative to the surface of the tire 11, and therefore it is otherwise free to twist within said cylinder 24. On the free end, and thus the proximal one relative to the surface of the tire 11, of said bar 23 is positioned the permanent magnetic 21, which, as shown in FIG. 2A, has its own two poles, and hence the associated magnetic field H, arranged according to a direction that is substantially tangential to the surface of the tire 11. In FIG. 2A, in particular, the postion of the permanent magnet 21 determines a magnetic field H that is tangential and aligned along the direction of rotation of the tire 11.

In FIG. 2B, as mentioned, the magnetic field source 13 is subjected to a temperature T2 higher than the temperature T1. The bar 23 of shape memory material, by virtue of the temperature rise, tends to twist, so that its proximal end, which bears the permanent magnet 21, rotates around the axis 25. In FIG. 2B, the permanent magnet 21 is rotated by substantially 90° and determines a magnetization in substantially perpendicular direction to the direction of rotation of the tire 11.

The magnetic field sensor 14 indirectly measures the temperature T of the tire 11, directly measuring the direction of the magnetic field H determined by the magnetization of the permanent magnet 21 positioned on the rotating element 22.

The magnetic field sensor 14, which can be for instance a spin valve sensor, sensitive to switches in magnetic field direction, is able to perceive the variation in the direction of the magnetic field H, so it can detect the temperature rise. In particular, appropriate circuits and micro-controllers in the electronic unit can be employed to measure the number of rotation of the permanent magnet 21 which take place over time, for instance by means of a simple counter, and hence determine the temperature of the tire 17.

The permanent magnet can be obtained by means of bulk magnetic materials or hard ferromagnetic thin films deposited by the corresponding thin film deposition techniques such as sputtering or electrodeposition. In this case the permanent magnet 21 can comprise a single film or a stack of multiple films, as well as composite materials constituted by ferromagnetic particles, having variable size (from nanometres to millimetres) and shapes, incorporated and magnetised in a polymeric matrix. Particles can be synthesised on site or off-site in the polymer. In the embodiment described herein, the magnetisation of the permanent magnet 21 does not change as a function of temperature.

Figure 3:
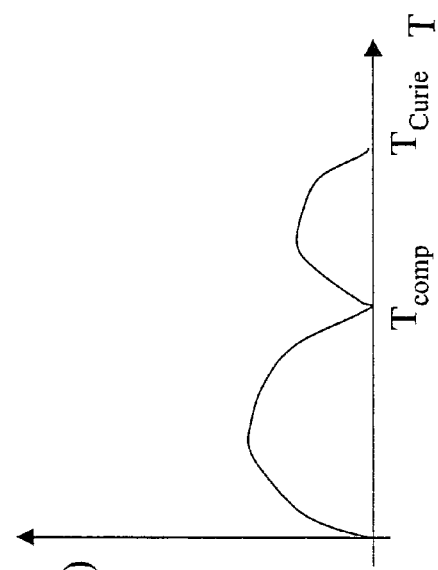
FIG. 3 shows a diagram relating to a quantity measured by the device of FIG. 1.

In any case, several magnetic materials are known to behave in a manner suitable for the application described above, i.e. with magnetisation response noticeably varying, not necessarily in linear fashion, over a range of temperatures between −40° C. and 300° C. FIG. 3 shows, in this regard, the profile, as a function of temperature T, of the absolute value Abs(M) of the magnetisation of a material suitable to form the permanent magnet 21. It is readily apparent that magnetisation assumes a minimum absolute value at a compensation temperature Tcomp and at the Curie temperature Tcurie.

The solution described above allows to achieve considerable advantages over prior art solutions.

The temperature sensing device according to the invention advantageously allows to correlate the temperature with rotations in the direction of the magnetic field, so that the correct determination of the intensity of said magnetic field to the sensor has less influence, because the transitions determined by the rotating element can be measured.

In particular, advantageously, the magnetic temperature sensing device proposed herein employs as a rotating element a shape memory material that is sensitive to temperature variations.

Naturally, without altering the principle of the invention, the construction details and the embodiments may vary widely relative to what is described and illustrated purely by way of example herein, without thereby departing from the scope of the present invention.

The rotating element can also be provided with a screw-type or helical advancing motion along the axis 25, for example by appropriately threading the cylinder and the bar of shape memory material. In this way the temperature variation transduces both into a rotation of the magnetic field, and into a change in its intensity. These parameters can be simultaneously measured by the magnetic field sensor, allowing to measure temperature with better precision.

Moreover, the element able to rotate as a function of temperature can be formed by means different from the bar of shape memory material described as the preferred embodiment. For example it is possible to exploit the variations in volume of a cell containing gas, to obtain a mechanical displacement to be translated into a rotary motion of the magnetic element.

The magnetic field sensor can be obtained with any digital or analogue magnetic field sensor, such as a simple solenoid, or an AMR (Anisotropic Magnetic Resistance), Hall, GMR (Giant Magnetic Resistance), TMR (Tunnel junction Magneto Resistance) sensor.

A temperature sensor device of the type described above can be used in a variety of applications requiring the measuring of a temperature.

In relation to measuring temperature in a tire, the temperature sensor may be a part of an appropriate measuring nit, further comprising tire wear sensors 14*a* and/or pressure sensors 14*b* and, possibly, actuators 14*c* or valves 14*d* to re-establish tire temperature, said unit being located directly on the tire and powered independently through the conversion of vibration energy deriving from the motion of the tire.

In particular, it is possible to exploit the sensor positioned on the fixed part to detect magnetic field variations in intensity and/or direction of other magnetic field sources under the control of other quantities, such as pressure.

However, it is clear that the proposed device can be applied in all temperature measurements compatible with a magnetic temperature sensing device like the one described herein, which includes at least one magnetic field source element associated with a rotatably moving part and a magnetic field sensing element associated with a fixed part to measure parameters of a magnetic field determined by said magnetic field source element, said parameters of the magnetic field being a function of the temperature of said rotatably moving part, where the magnetic field source element comprises means for rotating the direction of the emitted magnetic field along at least one axis.

The invention claimed is:

1. A magnetic temperature sensing device for rotatably moving parts rotating along at least a first axis of rotation, comprising:
   at least one magnetic field source element associated to said rotatably moving part; and
   a magnetic field sensing element associated with a fixed part to measure parameters of a magnetic field determined by said magnetic field source element, said parameters of the magnetic field being a function of the temperature of said rotatably moving part,
   wherein said magnetic field source element comprises means for rotating along at least a second respective axis of rotation the direction of said magnetic field as a function of the temperature of said rotatably moving part.

2. A device as claimed in claim 1, wherein said means for rotating along at least one axis the direction of said magnetic field comprise an element which rotates as function of temperature and permanent magnet.

3. A device as claimed in claim 2, wherein said rotating element comprises an element made of shape memory material, in particular nickel titanium alloy.

4. A device as claimed in claim 2, wherein said means for rotating along at least one axis the direction of said magnetic field are also able to displace said permanent magnet along said axis as a function of temperature.

5. A device as claimed in claim 4, wherein said parameters of the magnetic field measured by the magnetic field sensor comprise the direction and/or the intensity of the magnetic field.

6. A device as claimed in claim 5, wherein said magnetic field sensor is able to measure the magnetic field parameters of additional sources of magnetic field, variable according to a physical quantity and associated to said rotatably moving part, in particular said physical quantity being a pressure.

7. A device as claimed in claim 1, wherein said moving part is a tire for motor vehicle.

8. A device as claimed in claim 7, wherein the sensing device is included in a measuring unit, and further comprises at least one of wear sensors, pressure sensors actuators and valves to re-establish the temperature of the tire, said unit being positioned-directly on the tire.

9. A device as claimed in claim 1, wherein said permanent magnet is formed with bulk magnetic materials or hard ferromagnetic thin films or composite materials constituted by ferromagnetic particles incorporated and magnetized in a polymeric matrix.

10. A device as claimed in claim 1, wherein said magnetic field sensor is a spin valve device.

11. A device as claimed in claim 1, wherein it associates variations in temperature to variations in the direction of the magnetic field generated by the magnetic field source element and measured by the magnetic field sensor.

12. A device as claimed in claim 11, wherein it further associates variations in temperature to variations in the intensity of the magnetic field generated by the magnetic field source element and measured by the magnetic field sensor.

* * * * *